(12) United States Patent
Parks

(10) Patent No.: US 8,843,729 B2
(45) Date of Patent: Sep. 23, 2014

(54) MICROPROCESSOR THAT FUSES MOV/ALU INSTRUCTIONS

(75) Inventor: Terry Parks, Austin, TX (US)

(73) Assignee: VIA Technologies, Inc., New Taipei (TW)

( * ) Notice: Subject to any disclaimer, the term of this patent is extended or adjusted under 35 U.S.C. 154(b) by 868 days.

(21) Appl. No.: 13/034,839

(22) Filed: Feb. 25, 2011

(65) Prior Publication Data

US 2011/0264896 A1    Oct. 27, 2011

Related U.S. Application Data

(60) Provisional application No. 61/328,537, filed on Apr. 27, 2010.

(51) Int. Cl.
  *G06F 9/30* (2006.01)
  *G06F 9/38* (2006.01)
(52) U.S. Cl.
  CPC ............ *G06F 9/3017* (2013.01); *G06F 9/3857* (2013.01); *G06F 9/30145* (2013.01); *G06F 9/3861* (2013.01)
  USPC ....................................................... 712/208
(58) Field of Classification Search
  CPC . G06F 9/30145; G06F 9/3017; G06F 9/3861; G06F 9/3857
  USPC ....................................................... 712/208
  See application file for complete search history.

(56) References Cited

U.S. PATENT DOCUMENTS

| | | | |
|---|---|---|---|
| 5,542,084 A | 7/1996 | Lowe, Jr. | |
| 6,338,136 B1 | 1/2002 | Col et al. | |
| 6,370,625 B1 | 4/2002 | Carmean et al. | |
| 6,647,489 B1 | 11/2003 | Col et al. | |
| 7,458,069 B2 * | 11/2008 | Ronen et al. | ................. 717/151 |
| 7,937,561 B2 | 5/2011 | Col et al. | |
| 8,082,430 B2 | 12/2011 | Valentine et al. | |
| 2003/0236967 A1 | 12/2003 | Samra et al. | |
| 2004/0034757 A1 | 2/2004 | Gochman et al. | |
| 2006/0004998 A1 | 1/2006 | Saha et al. | |

(Continued)

FOREIGN PATENT DOCUMENTS

WO    WO2009082430    7/2009

OTHER PUBLICATIONS

Petric et al.; "RENO: A Rename-Based Instruction Optimizer"; IEEE; 2005.*

(Continued)

*Primary Examiner* — Andrew Caldwell
*Assistant Examiner* — Benjamin Geib
(74) *Attorney, Agent, or Firm* — E. Alan Davis; James W. Huffman

(57) ABSTRACT

A microprocessor receives first and second program-adjacent macroinstructions of the instruction set architecture of the microprocessor. The first macroinstruction instructs the microprocessor to move a first operand to a first architectural register from a second architectural register. The second macroinstruction instructs the microprocessor to perform an arithmetic/logic operation using the first operand in the second architectural register and a second operand in a third architectural register to generate a result and to load the result back into the first architectural register. An instruction translator simultaneously translates the first and second program-adjacent macroinstructions into a single micro-operation for execution by an execution unit. The single micro-operation instructs the execution unit to perform the arithmetic/logic operation using the first operand in the second architectural register and the second operand in third architectural register to generate the result and to load the result back into the first architectural register.

26 Claims, 5 Drawing Sheets

(56) References Cited

U.S. PATENT DOCUMENTS

2009/0204800 A1    8/2009    Hooker et al.
2010/0115248 A1    5/2010    Ouziel et al.

OTHER PUBLICATIONS

Case, Loyd. "The Core 2: Intel Goes for the Jugular." ExtremeTech. Jul. 13, 2006. pp. 1-6. Downloaded Apr. 20, 2010 from http://www.extremetech.com/.

Tian, Xinmin. "Inside the Intel® 10.1 Compilers: New Threadizer and New Vectorizer for Intel® Core™ 2 Processors."Intel® Technology Journal. vol. 11, Issue 04, Published Nov. 25, 2007. p. 263-274.
Intel® 64 and IA-32 Architectures Optimization Reference Manual. Nov. 2009. pp. 3-18 to 3-21.
Patterson, David et al. "Computer Architecture: A Quantitative Approach." Morgan Kaufmann Publishers, Inc. 1996. pp. 251-261 and 278-288.

* cited by examiner

MICROPROCESSOR THAT FUSES MOV/ALU INSTRUCTIONS

CROSS REFERENCE TO RELATED APPLICATION(S)

This application claims priority based on U.S. Provisional Application Ser. No. 61/328,537, filed Apr. 27, 2010, entitled MICROPROCESSOR THAT FUSES MOV/ALU INSTRUCTIONS; MICROPROCESSOR THAT FUSES MOV/ALU/JCC INSTRUCTIONS, which is hereby incorporated by reference in its entirety.

This application is related to U.S. Non-Provisional application Ser. No. 13/034,865, filed concurrently herewith, entitled MICROPROCESSOR THAT FUSES MOV/ALU/JCC INSTRUCTIONS, which claims priority to U.S. Provisional Application Ser. No. 61/328,537, filed Apr. 27, 2010, each of which is hereby incorporated by reference in its entirety.

This application is related to U.S. Non-Provisional application Ser. No. 13/034,808, filed concurrently herewith, entitled MICROPROCESSOR THAT FUSES LOAD-ALU-STORE AND JCC MACROINSTRUCTIONS, which claims priority to U.S. Provisional Application Ser. No. 61/328,524, filed Apr. 27, 2010, each of which is hereby incorporated by reference in its entirety.

FIELD OF THE INVENTION

The present invention relates in general to the field of instruction translation in microprocessors, and particularly to the fusion of macroinstructions during translation.

BACKGROUND OF THE INVENTION

Many modern microprocessors have both a user-visible architecture (sometimes referred to as "macroarchitecture"), i.e., the instruction set and resources that programmers may use, and a distinct microarchitecture. A macroinstruction is an instruction in the instruction set of the microprocessor architecture. In contrast, a micro-op is an instruction in the microinstruction set of the microarchitecture. The execution units of such a microprocessor actually execute micro-ops rather than macroinstructions. An instruction translator translates macroinstructions into one or more micro-ops that are sent to the execution units for execution. The instruction throughput, or rate at which the microprocessor can process macroinstructions of a program, is largely a function of the rate at which the instruction translator translates program macroinstructions into micro-ops. This is particularly true for superscalar and/or out-of-order execution microprocessors.

BRIEF SUMMARY OF INVENTION

In one aspect the present invention provides a microprocessor configured to receive first and second program-adjacent macroinstructions of the instruction set architecture of the microprocessor, wherein the first macroinstruction instructs the microprocessor to move a first operand to a first architectural register of the microprocessor from a second architectural register of the microprocessor, wherein the second macroinstruction instructs the microprocessor to perform an arithmetic/logic operation using the first operand in the second architectural register and a second operand in a third architectural register of the microprocessor to generate a result and to load the result back into the first architectural register. The microprocessor includes an execution unit and an instruction translator. The instruction translator is configured to simultaneously translate the first and second program-adjacent macroinstructions into a single micro-operation for execution by the execution unit. The single micro-operation instructs the execution unit to perform the arithmetic/logic operation using the first operand in the second architectural register and the second operand in third architectural register to generate the result and to load the result back into the first architectural register.

In another aspect, the present invention provides a method for a microprocessor to process first and second program-adjacent macroinstructions of the instruction set architecture of the microprocessor, wherein the first macroinstruction instructs the microprocessor to move a first operand to a first architectural register of the microprocessor from a second architectural register of the microprocessor, wherein the second macroinstruction instructs the microprocessor to perform an arithmetic/logic operation using the first operand in the second architectural register and a second operand in a third architectural register of the microprocessor to generate a result and to load the result back into the first architectural register. The method includes simultaneously translating the first and second program-adjacent macroinstructions into a single micro-operation for execution by an execution unit of the microprocessor. The single micro-operation instructs the execution unit to perform the arithmetic/logic operation using the first operand in the second architectural register and the second operand in third architectural register to generate the result and to load the result back into the first architectural register.

In yet another aspect, the present invention provides a computer program product encoded in at least one computer readable medium for use with a computing device, the computer program product comprising computer readable program code embodied in said medium for specifying a microprocessor configured to receive first and second program-adjacent macroinstructions of the instruction set architecture of the microprocessor, wherein the first macroinstruction instructs the microprocessor to move a first operand to a first architectural register of the microprocessor from a second architectural register of the microprocessor, wherein the second macroinstruction instructs the microprocessor to perform an arithmetic/logic operation using the first operand in the second architectural register and a second operand in a third architectural register of the microprocessor to generate a result and to load the result back into the first architectural register. The computer readable program code includes first program code for specifying an execution unit and second program code for specifying an instruction translator configured to simultaneously translate the first and second program-adjacent macroinstructions into a single micro-operation for execution by the execution unit. The single micro-operation instructs the execution unit to perform the arithmetic/logic operation using the first operand in the second architectural register and the second operand in third architectural register to generate the result and to load the result back into the first architectural register.

DETAILED DESCRIPTION OF THE INVENTION

Figure 1:
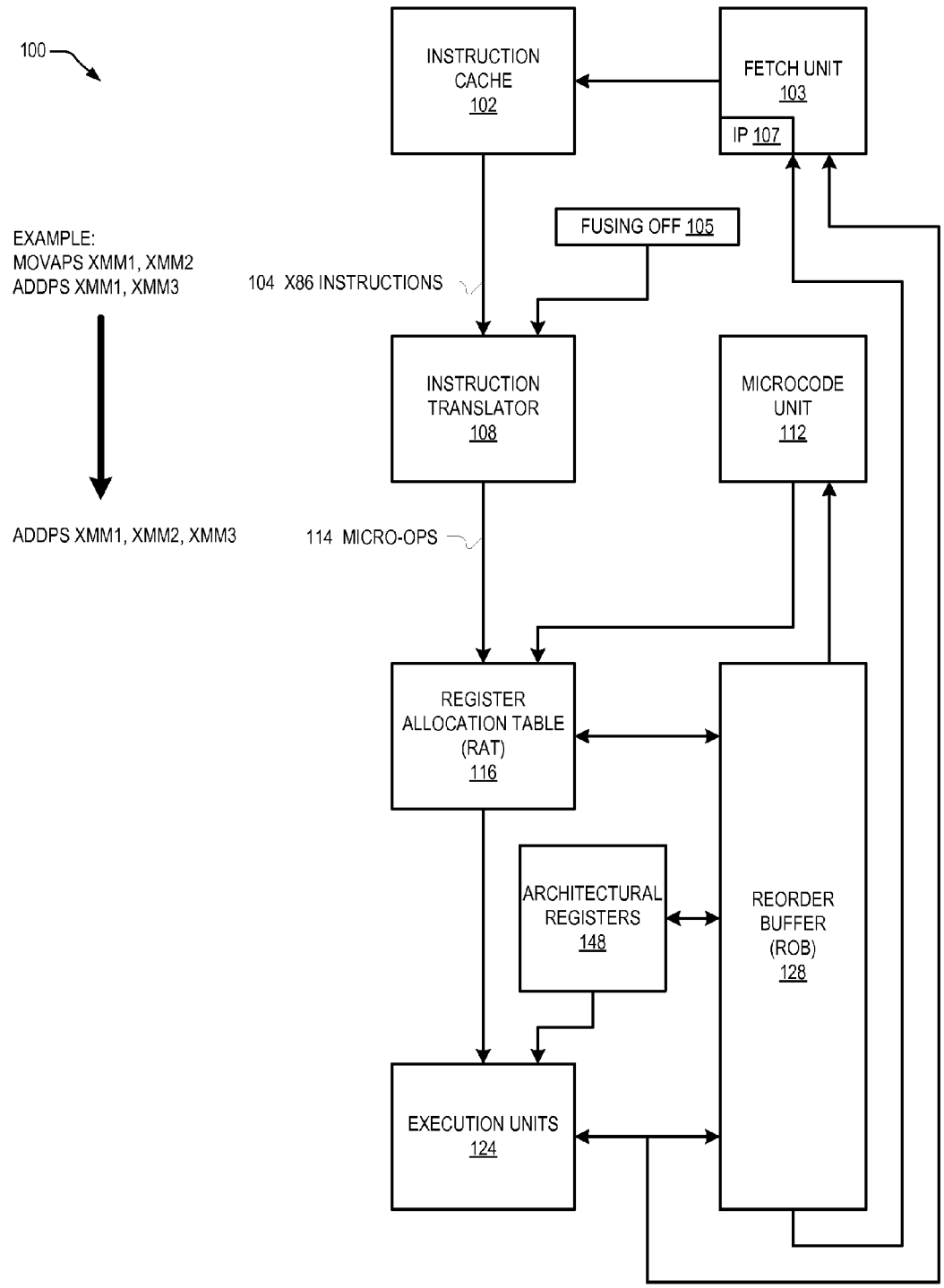
FIG. 1 is a block diagram illustrating a microprocessor according to the present invention.

Referring now to FIG. 1, a block diagram illustrating a microprocessor 100 according to the present invention is shown. The microprocessor 100 includes an instruction cache 102 and a fetch unit 103 configured to control the fetching of macroinstructions 104 from the instruction cache 102. The fetch unit 103 includes an architectural instruction pointer 107 register. When an instruction of the instruction set architecture is retired, the architectural instruction pointer 107 is updated with the address of the next instruction in the instruction stream. In the case of a non-taken branch instruction, the address of the next instruction in the instruction stream is the next sequential instruction. In the case of a taken branch instruction, the address of the next instruction in the instruction stream is the target address of the taken branch instruction. Most of the time, the fetch address provided by the fetch unit 103 to the instruction cache 102 is different from the architectural instruction pointer 107 value because of the pipelined nature of the microprocessor 100 and because the microprocessor also includes a branch predictor that predicts the direction and target address of branch instructions much earlier in the pipeline than they are retired. The macroinstructions 104 are specified by the instruction set architecture of the microprocessor 100. According to one embodiment, the instruction set architecture of the microprocessor 100 conforms substantially to the x86 architecture (also referred to as IA-32) and the macroinstructions 104 are instructions from the x86 instruction set architecture. A processor is an x86 architecture processor if it can correctly execute a majority of the application programs that are designed to be executed on an x86 processor. An application program is correctly executed if its expected results are obtained. In particular, the microprocessor 100 executes instructions of the x86 instruction set and includes the x86 user-visible register set.

The microprocessor 100 also includes an instruction translator 108 configured to translate the macroinstructions 104 into micro-operations (micro-ops or uops) 114 for execution by execution units 124 of the microprocessor 100. The instruction translator 108 will be described in more detail below.

The microprocessor 100 also includes a microcode unit 112 that includes a microcode memory configured to store microcode, or microcode routines, and a microsequencer for fetching from the microcode memory instructions of the microcode, which are also micro-ops 114.

The microprocessor 100 also includes a register allocation table (RAT) 116 that receives the micro-ops 114 from the instruction translator 108 and the microcode unit 112 in program order. The RAT 116 generates and maintains a table of dependency information for the micro-ops 114. The RAT 116 is coupled to execution units 124, and a reorder buffer (ROB) 128 of the microprocessor 100. The execution units 124 execute the micro-ops 114; more specifically, one of the execution units 124 executes ALU micro-ops 114 (of FIG. 3) that are generated by the instruction translator 108 when fusing eligible MOV and ALU macroinstructions 104. The microprocessor also includes architectural registers 148 and non-architectural registers (not shown) of the microprocessor 100. According to one embodiment, the architectural registers 148 include the well-known x86 EFLAGS register.

Figures 2, 3:
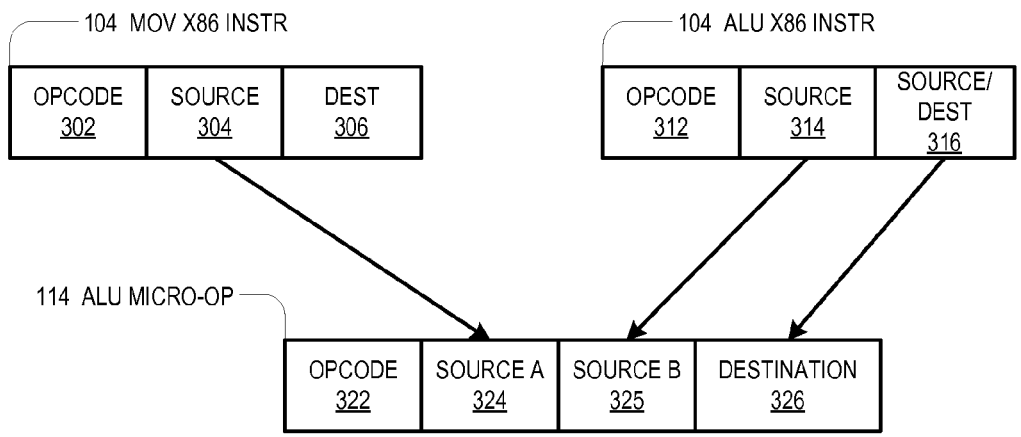
FIG. 2 is a block diagram illustrating an entry in the ROB of FIG. 1.
FIG. 3 is a block diagram illustrating fields of an x86 register MOV type macroinstruction and an x86 register ALU type macroinstruction and their fusion by the instruction translator of FIG. 1 into an ALU micro-op according to the present invention.

The ROB 128 is a circular queue, or array, of entries, whose structure is shown in more detail with respect to FIG. 2. Each ROB entry 232 stores information for a different micro-op 114. The RAT 116 also allocates an entry in the ROB 118 for each micro-op 114 before dispatching it to a reservation station (not shown) where the micro-op 114 waits to be dispatched to an execution unit 124. Thus, the ROB 128 maintains the micro-ops 114 in program order, which enables the ROB 128 to retire in program order the micro-ops 114 and their corresponding macroinstructions 104 from which they were translated.

Advantageously, the instruction translator 108 is configured to fuse two macroinstructions 104 into a single micro-op 114. That is, when the instruction translator 108 detects a condition in which it receives two adjacent macroinstructions 104 of a specific type from the stream of macroinstructions 104, the instruction translator 108 is capable of decoding and translating the two adjacent specific type macroinstructions 104 into a single micro-op 114, namely an ALU micro-op 114, that performs the function, or semantic, instructed by the two fused macroinstructions 104. More specifically, the instruction translator 108 fuses two adjacent macroinstructions 104 in which the first is a register move (MOV) type macroinstruction and the second is a register arithmetic/logic (ALU) macroinstruction. An example of a register MOV type macroinstruction is an x86 MOVAPS XMM1, XMM2 instruction, which instructs the microprocessor 100 to move the operand from the XMM2 register to the XMM1 register of the microprocessor 100. An example of a register ALU type macroinstruction is an x86 ADDPS XMM1, XMM3 instruction, which instructs the microprocessor 100 to add the values in the XMM1 and XMM3 registers and place the result in the XMM1 register. Although examples of the register MOV and ALU type macroinstructions are mentioned above, it should be understood that many other x86 register MOV and ALU type macroinstructions exist and new ones may be created in the future, for which the embodiments described herein may be applied to advantage.

A conventional instruction translator 108 may translate the two macroinstructions 104 of the type just described into two distinct micro-ops 114. More specifically, the conventional instruction translator 108 may translate the register MOV macroinstruction into one micro-op 114 and translate the register ALU macroinstruction into a second micro-op 114. However, according to the present invention, the instruction translator 108 advantageously fuses the two macroinstructions 104 into a single ALU micro-op 114. This is advantageous in that it may increase the rate of instructions per clock cycle, or throughput, of the microprocessor 100 because fewer resources of the microprocessor 100 are used to process the two adjacent register MOV/ALU macroinstructions 104. For example, because one less micro-op 114 is dispatched to the portion of the microprocessor 100 pipeline below the instruction translator 108, one less entry in each of the RAT 116, reservation stations, and ROB 128 is consumed, which may effectively increase the lookahead capability of the out-of-order execution microprocessor 100 to take advantage of instruction-level parallelism, for example. Additionally, one less slot is taken up in the execution units 124, which may be used to execute another micro-op. The macroinstruction fusion is also advantageous in an instruction translator 108 that is capable of emitting a limited number of micro-ops 114 per clock cycle because it enables the instruction translator 108 to consume more macroinstructions 104 per clock cycle. Still further, the ability to translate two macroinstructions in the same clock cycle allows the instruction translator 108 to see and translate subsequent macroinstructions sooner than if the instruction translator 108 had to wait an additional clock cycle to translate the second macroinstruction. This is particularly important for subsequent macroinstructions that are branch instructions. Furthermore, the ability to retire both the macroinstructions in the same clock cycle may increase throughput. Finally, a narrower instruction translator 108 is potentially smaller, faster, and has lower power consumption than a relatively wider instruction translator 108.

The microprocessor 100 also includes a control register 105 that includes a bit that instructs the instruction translator 108 whether or not to perform fusing according to the instruction fusing feature described herein.

Referring now to FIG. 2, a block diagram illustrating an entry 232 in the ROB 128 of FIG. 1 is shown. The entry includes a result field 202 for storing a result of the micro-op 114, a completed flag 204, an exception flag 206, a next sequential instruction pointer (NSIP) field 208, and a fused flag 212. When an execution unit 124 completes execution of a micro-op 114, it sets the completed flag 204.

When an execution unit 124 detects that a micro-op 114 causes an exception condition, the execution unit 124 sets the exception flag 206 in the entry 232 allocated to the micro-op 114. When the micro-op 114 is ready to retire, if the ROB 128 detects that the exception flag 206 is set, the ROB 128 takes necessary action, such as refraining from updating the architectural state of the microprocessor 100 with the result of the micro-op 114 and/or invoking an exception handler, such as of the microcode unit 112, as described below.

The fused flag 212 indicates whether the micro-op 114 was translated from a fusion of two macroinstructions 104 by the instruction translator 108.

The NSIP field 208 holds the next sequential instruction pointer (NSIP), which is the memory address of the next sequential instruction after the macroinstruction 104 from which the micro-op 114 was translated. The NSIP flows down the pipeline with each micro-op 114. In the case of fused macroinstructions 104, the NSIP field 208 holds the memory address of the next sequential instruction after the last of the fused macroinstructions 104 from which the micro-op 114 was translated. The use of the NSIP field 208 is described in more detail below with respect to block 434 of FIG. 4 and block 734 of FIG. 7.

Referring now to FIG. 3, a block diagram illustrating fields of an x86 register MOV type macroinstruction 104 and an x86 register ALU type macroinstruction 104 and their fusion by the instruction translator 108 of FIG. 1 into an ALU micro-op 114 according to the present invention is shown.

The register MOV macroinstruction 104 includes an opcode field 302, a source field 304, and a destination field 306. The source field 304 specifies the source register of the data operand to be moved. The destination field 306 specifies the destination register of the data operand to be moved from the source register.

The register ALU macroinstruction 104 includes an opcode field 312, a source field 314, and a source/destination field 316. The source field 314 specifies the source register of a first data operand of the arithmetic/logical operation specified in the opcode 312. The source/destination field 316 specifies the destination register of the arithmetic/logical operation, which is also the source register of a second data operand of the arithmetic/logical operation.

The ALU micro-op 114 includes an opcode field 322, a source A field 324, a source B field 324, and a destination field 326. The instruction translator 108 transfers the value from the source field 304 of the register MOV macroinstruction 104 to the source A field 324 of the ALU micro-op 114. The instruction translator 108 transfers the value from the source field 314 of the register ALU macroinstruction 104 to the source B field 325 of the ALU micro-op 114. The instruction translator 108 transfers the value from the source/destination field 316 of the register ALU macroinstruction 104 to the destination field 326 of the ALU micro-op 114.

Figure 4:
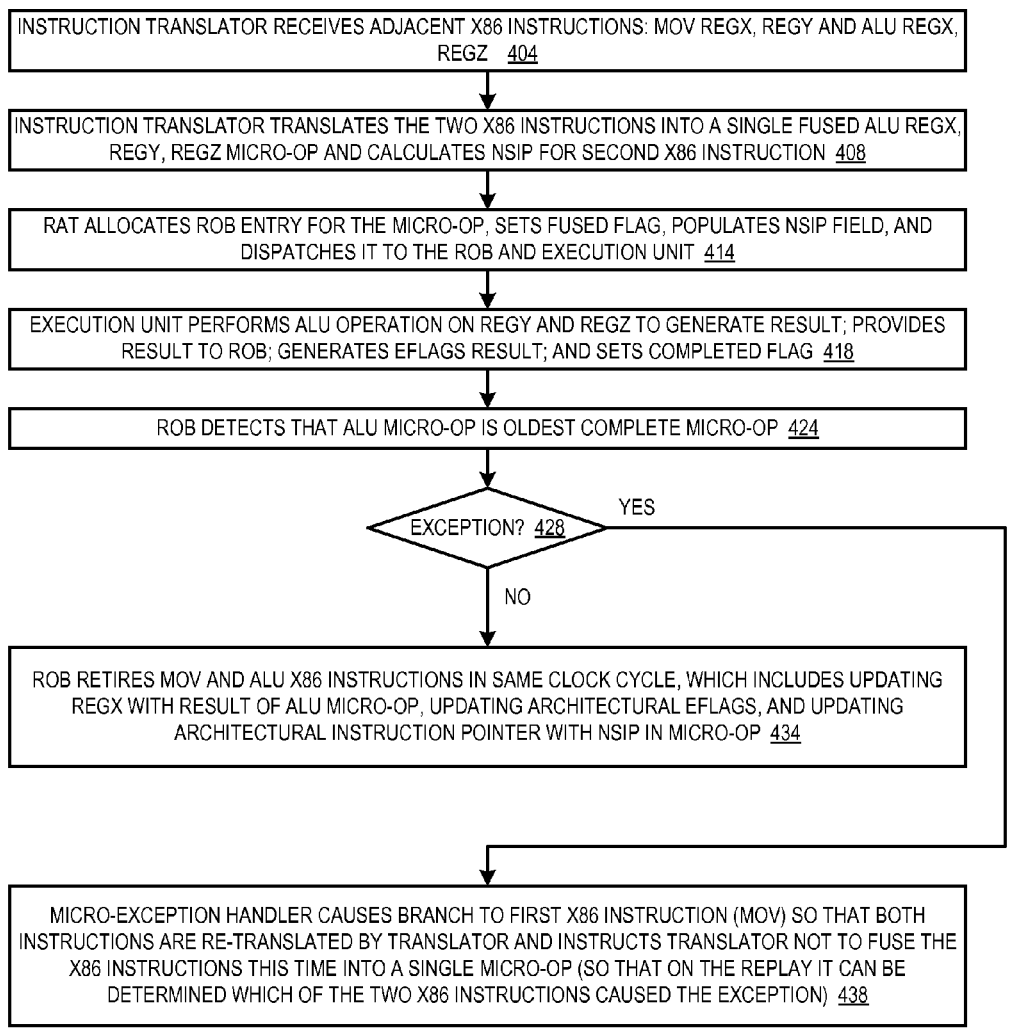
FIG. 4 is a flowchart illustrating operation of the microprocessor of FIG. 1 to perform macroinstruction fusing and execution of the resultant translated micro-ops.

Referring now to FIG. 4, a flowchart illustrating operation of the microprocessor 100 of FIG. 1 to perform macroinstruction fusing and execution of the resultant translated micro-ops 114 is shown. Flow begins at block 404.

At block 404, the instruction translator 108 receives an x86 register MOV type macroinstruction 104 and an adjacent x86 register ALU type macroinstruction 104 from the instruction cache 102. More specifically, the register MOV macroinstruction 104 specifies a first register (referred to generically as REGY) as the source register 304 and specifies a second register (referred to generically as REGX) as the destination register 306. Additionally, the register ALU macroinstruction 104 specifies as its source register 314 a third register (referred to generically as REGZ) and specifies as its source/destination register 316 the destination register 306 specified by the register MOV macroinstruction 104. Advantageously, the present inventors recognized that the register MOV macroinstruction 104 and the register ALU macroinstruction 104 in combination effectively perform the ALU operation on REGY and REGZ, and then place the result in REGX. Consequently, they take advantage of this fact and the fact that the ALU instructions of the microarchitecture of the microprocessor 100 accommodates two source operands and a third destination operand, and have configured the instruction translator 108 to fuse the two appropriately register-specifying MOV and ALU macroinstructions 104 into a single ALU micro-op 114. It is noted that ALU macroinstructions 104 that specify ALU operations other than addition may also be fused. Flow proceeds to block 408.

At block 408, the instruction translator 108 translates the macroinstructions 104 received at block 404 into a single ALU micro-op 114, as shown in FIG. 3. Additionally, the instruction translator 108 calculates the NSIP of the last of the fused macroinstructions 104, i.e., the memory address of the macroinstruction 104 after the ALU macroinstruction 104. Flow proceeds to block 414.

At block 414, the RAT 116 receives the ALU micro-op 114, calculates its dependencies, and allocates an entry 232 for it in the ROB 128. The RAT 116 also sets the fused flag 212 in the allocated entry 232 to indicate that it was translated from fused macroinstructions 104. Additionally, the RAT 116 populates the NSIP field 208 of the entry 232 with the NSIP calculated at block 408. Finally, the RAT 116 dispatches the ALU micro-op 114 to a reservation station for execution by the execution units 124. Flow proceeds to block 418.

At block 418, the execution unit 124 performs the ALU operation specified by the ALU micro-op 114 on the operands in the registers specified by the source A 324 and source B 325 fields of the ALU micro-op 114 to generate a result. The execution unit 124 provides the result to the ROB 128 for storage in the result field 202 (for subsequent storage to the destination register specified by the destination 326 field at block 434, subject to an exception condition). The execution unit 124 also generates an intermediate EFLAGS result based on the value of the result of the ALU operation. Finally, the execution unit 124 sets the completed flag 204. Flow proceeds to block 424.

At block 424, the ROB 128 detects that the ALU micro-op 114 is the oldest complete micro-op 114 in the ROB 128. That is, the ROB 128 detects that the ALU micro-op 114 entry 232 is at the head of the ROB 128 and its completed flag 204 is set. Flow proceeds to decision block 428.

At decision block 428, the ROB 128 determines whether the ALU micro-op 114 has caused an exception condition. That is, the ROB 128 determines whether the exception flag 206 is set in the ROB entry 232 allocated to the ALU micro-op 114. If so, flow proceeds to block 438; otherwise, flow proceeds to block 434.

At block 434, the ROB 128 retires the register MOV and register ALU macroinstructions 104, which includes updating REGX (i.e., the register specified in the destination field 326 of the ALU micro-op 114) with the value from the result field 202 of the ROB entry 232 of the ALU micro-op 114. Additionally, retiring the ALU micro-op 114 includes updating the architectural EFLAGS register with the intermediate value generated at block 418. Finally, retiring the ALU micro-op 114 includes updating the architectural instruction pointer 107 with the NSIP field 208 value. In one embodiment, the ROB 128 retires the two macroinstructions 104 in the same clock cycle. Flow ends at block 434.

At block 438, because an exception was detected, the ROB 128 does not update the architectural state of the microprocessor 100 with the results of the ALU micro-op 114. Instead, the ROB 128 invokes an exception handler in the microcode unit 112. The exception handler causes the fetch unit 103 to flush all instructions in the microprocessor 100 pipeline newer than the ALU micro-op 114. The exception handler also sets the fusing off bit in the control register 105 of FIG. 1 and causes the fetch unit 103 to branch back to the first fused macroinstruction 104, i.e., to the x86 register MOV macroinstruction 104. This will cause the instruction translator 108 to re-translate the register MOV macroinstruction 104 and the register ALU macroinstruction 104; however, this time the instruction translator 108 will not fuse the two macroinstructions 104. Rather, the instruction translator 108 will translate them in a conventional manner into two distinct micro-ops 114; namely, the instruction translator 108 will translate the register MOV macroinstruction 104 into a register MOV micro-op 114, and will translate the register ALU macroinstruction 104 into a register ALU micro-op 114. Consequently, the RAT 116 will not set the fused flag 212 in the ROB entries 232 allocated for the two micro-ops 114, and the RAT 116 will populate the NSIP field 208 of the conventional register MOV micro-op 114 with the memory address of the register ALU macroinstruction 104 and will populate the NSIP field 208 of the register ALU micro-op 114 with the memory address of the next sequential macroinstruction 104 after the register ALU macroinstruction 104. Therefore, when the replay of the two micro-ops 114 translated from the two macroinstructions 104 occurs, it will be possible for the ROB 128 to determine which of the two macroinstructions 104 caused the exception condition so that the microprocessor 100 can handle the exception appropriately. In one embodiment, the exception handler write to the fusing off bit in the control register 105 creates a pulse to the instruction translator 104 that causes the instruction translator 108 to not fuse the next macroinstruction 104 it encounters (i.e., the register MOV macroinstruction 104 that is followed by the register ALU macroinstruction 104), but to resume fusing instructions thereafter when possible. Flow ends at block 438.

Figure 5:
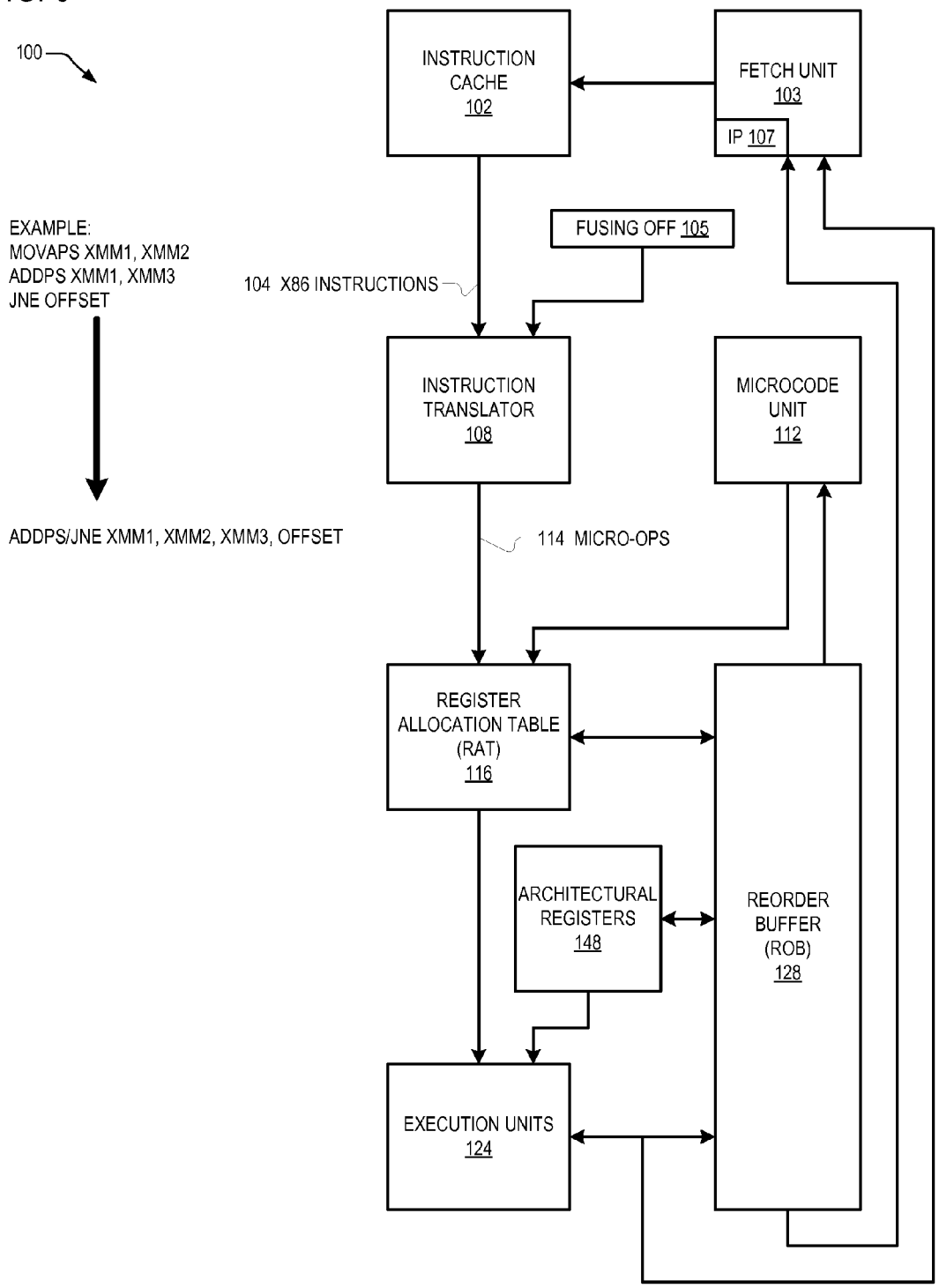
FIG. 5 is a block diagram illustrating a microprocessor according to the present invention.

Referring now to FIG. 5, a block diagram illustrating a microprocessor 100 according to the present invention is shown. The microprocessor 100 of FIG. 5 is similar to the microprocessor 100 of FIG. 1. However, the instruction translator 108 of FIG. 5 is configured to fuse three macroinstructions 104 into a single micro-op 114. That is, when the instruction translator 108 detects a condition in which it receives three adjacent macroinstructions 104 of a specific type from the stream of macroinstructions 104, the instruction translator 108 is capable of decoding and translating the three adjacent specific type macroinstructions 104 into a single micro-op 114, namely an ALU/JCC micro-op 114, that performs the function, or semantic, instructed by the three fused macroinstructions 104. More specifically, the instruction translator 108 fuses three adjacent macroinstructions 104 in which the first is a register move (MOV) type macroinstruction (as in the embodiment of FIG. 1) and the second is a register arithmetic/logic (ALU) macroinstruction (as in the embodiment of FIG. 1) and the third is a conditional jump (JCC) type macroinstruction. An example of a JCC type macroinstruction is an x86 JCC instruction, such as JNE (jump if not equal), JZ (jump if zero), and so forth, which instructs the microprocessor 100 to jump to a target address (whose offset from the address of the instruction itself is specified in the Jcc instruction) if the condition is true and otherwise to continue fetching the next sequential instruction. Although examples of the JCC type macroinstructions are mentioned above, it should be understood that many other x86 conditional jump type macroinstructions exist and new ones may be created in the future, for which the embodiments described herein may be applied to advantage.

A conventional instruction translator 108 may translate the three macroinstructions 104 of the type just described into three distinct micro-ops 114. More specifically, the conventional instruction translator 108 may translate the register MOV macroinstruction into one micro-op 114 and translate the register ALU macroinstruction into a second micro-op 114 and translate the JCC macroinstruction into a third micro-op 114. However, according to the present invention, the instruction translator 108 advantageously fuses the three macroinstructions 104 into a single ALU/JCC micro-op 114. This is advantageous in that it may increase the number of instructions per clock cycle, or throughput, of the microprocessor 100 because fewer resources of the microprocessor 100 are used to process the three adjacent register MOV/ALU/JCC macroinstructions 104. For example, because two less micro-ops 114 are dispatched to the portion of the microprocessor 100 pipeline below the instruction translator 108, two less entries in each of the RAT 116, reservation stations, and ROB 128 are consumed, which may effectively increase the lookahead capability of the out-of-order execution microprocessor 100 to take advantage of instruction-level parallelism, for example. Additionally, two less slots are taken up in the execution units 124, which may be used to execute other micro-ops. The macroinstruction fusion is also advantageous in an instruction translator 108 that is capable of emitting a limited number of micro-ops 114 per clock cycle because it enables the instruction translator 108 to consume more macroinstructions 104 per clock cycle. Still further, the ability to translate three macroinstructions in the same clock cycle allows the instruction translator 108 to see and translate subsequent macroinstructions sooner than if the instruction translator 108 had to wait an additional clock cycle to translate the third macroinstruction. This is particularly important for subsequent macroinstructions that are branch instructions. Furthermore, the ability to retire three macroinstructions in the same clock cycle may increase throughput. Finally, a narrower instruction translator 108 is potentially smaller, faster, and has lower power consumption than a relatively wider instruction translator 108.

Figure 6:
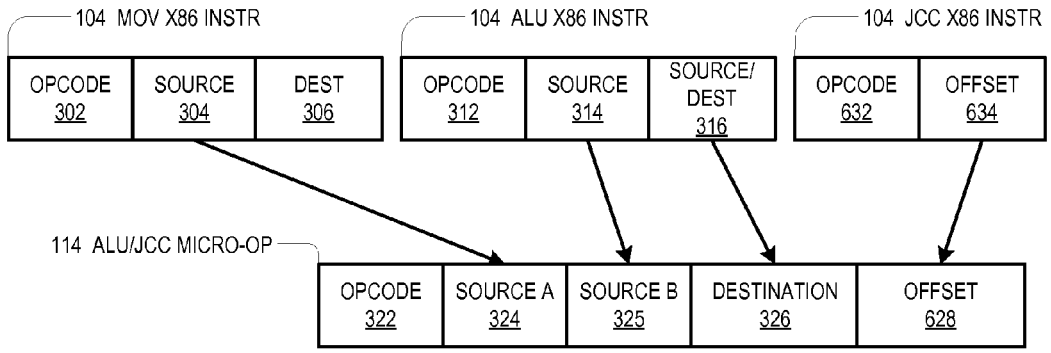
FIG. 6 is a block diagram illustrating fields of an x86 register MOV type macroinstruction, an x86 register ALU type macroinstruction, and an x86 JCC type macroinstruction and their fusion by the instruction translator of FIG. 5 into a register ALU/JCC micro-op according to the present invention.

Referring now to FIG. 6, a block diagram illustrating fields of an x86 register MOV type macroinstruction 104, an x86 register ALU type macroinstruction 104, and an x86 JCC type macroinstruction and their fusion by the instruction translator 108 of FIG. 5 into a register ALU/JCC micro-op 114 according to the present invention is shown.

The register MOV and register ALU macroinstructions 104 are similar to those of FIG. 3.

The JCC macroinstruction 104 includes an opcode field 632 and an offset field 634. The offset field 634 specifies an offset used to calculate the target address to which the fetch unit 103 transfers control if the condition specified in the opcode 632 is satisfied.

The ALU/JCC micro-op 114 includes an opcode field 322, a source A field 324, a source B field 324, and a destination field 326, similar to the ALU micro-op 114 of FIG. 3, which are populated by the instruction translator 108 in a manner similar to that described above with respect to FIG. 3, as shown in FIG. 6. However, the opcode 322 of the ALU/JCC micro-op 114 not only specifies an ALU operation, but also instructs the execution unit 124 to perform a conditional jump based on the intermediate EFLAGS result of the ALU operation, as described in more detail below. The ALU/JCC micro-op 114 also includes an offset field 628 into which the instruction translator 108 transfers the value from the offset field 634 of the JCC macroinstruction 104, as shown in FIG. 6.

Figure 7:
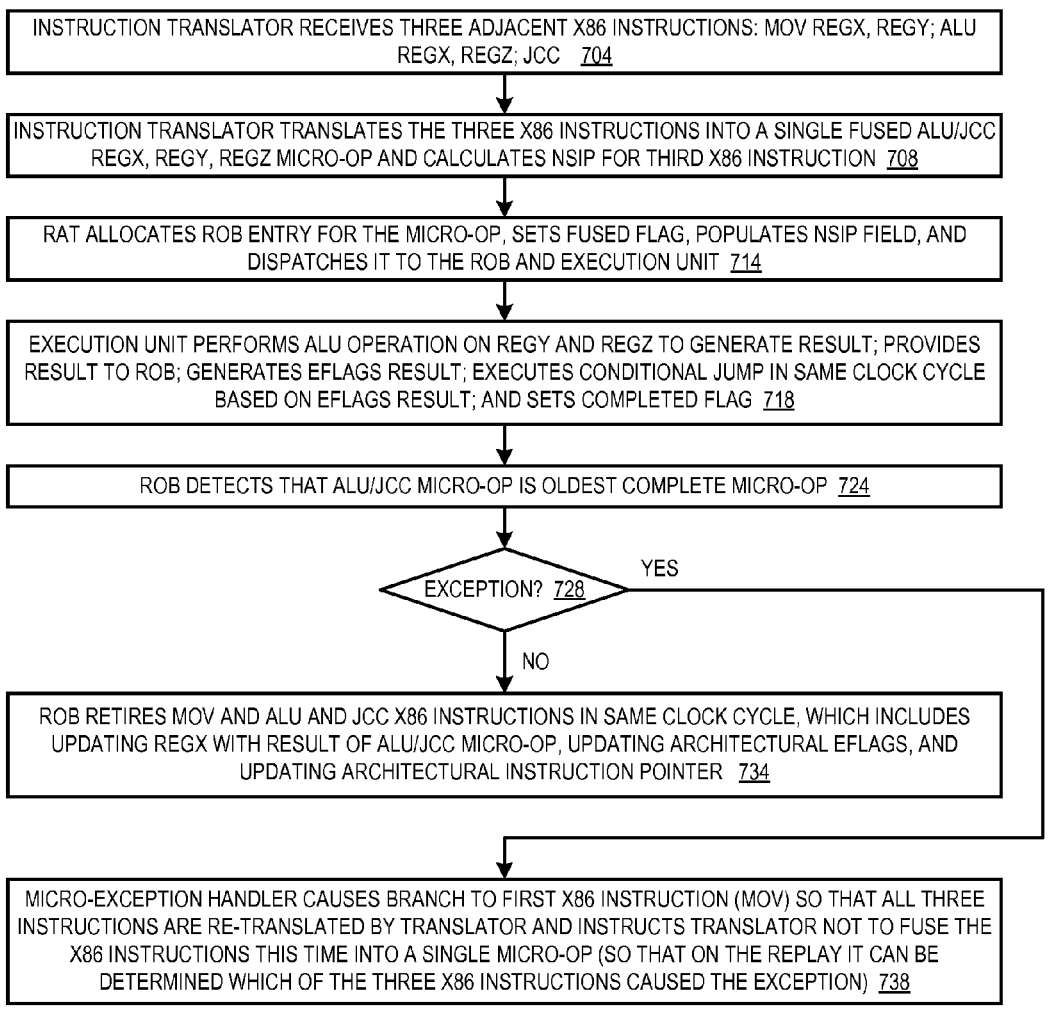
FIG. 7 is a flowchart illustrating operation of the microprocessor of FIG. 5 to perform macroinstruction fusing and execution of the resultant translated micro-ops.

Referring now to FIG. 7, a flowchart illustrating operation of the microprocessor 100 of FIG. 5 to perform macroinstruction fusing and execution of the resultant translated micro-ops 114 is shown. Flow begins at block 704.

At block 704, the instruction translator 108 receives an x86 register MOV type macroinstruction 104 and an adjacent x86 register ALU type macroinstruction 104 and an adjacent x86 register JCC type macroinstruction 104 from the instruction cache 102. The register MOV and ALU macroinstructions 104 are similar to those described with respect to block 404 of FIG. 4. That is, the register MOV macroinstruction 104 specifies REGY as the source register 304 and REGX as the destination register 306; and the register ALU macroinstruction 104 specifies REGZ as its source register 314 and specifies REGX as its source/destination register 316. Advantageously, the present inventors recognized that the register MOV macroinstruction 104 and the register ALU macroinstruction 104 in combination effectively perform the ALU operation on REGY and REGZ, and then place the result in REGX. Additionally, they have provided the ALU/JCC micro-op 114 that instructs an execution unit to perform an ALU operation to generate an intermediate EFLAGS result and to execute a conditional jump in the same clock cycle using the intermediate EFLAGS result. Consequently, they take advantage of these facts and the fact that the ALU instructions of the microarchitecture of the microprocessor 100 accommodate two source operands and a third destination operand, and have configured the instruction translator 108 to fuse the three appropriately register-specifying MOV and ALU macroinstructions 104 and JCC macroinstruction 104 into a single ALU/JCC micro-op 114. Flow proceeds to block 708.

At block 708, the instruction translator 108 translates the macroinstructions 104 received at block 704 into a single ALU/JCC micro-op 114, as shown in FIG. 6. Additionally, the instruction translator 108 calculates the NSIP of the last of the fused macroinstructions 104, i.e., the memory address of the macroinstruction 104 after the JCC macroinstruction 104. Flow proceeds to block 714.

At block 714, the RAT 116 receives the ALU/JCC micro-op 114, calculates its dependencies, and allocates an entry 232 for it in the ROB 128. The RAT 116 also sets the fused flag 212 in the allocated entry 232 to indicate that it was translated from fused macroinstructions 104. Additionally, the RAT 116 populates the NSIP field 208 of the entry 232 with the NSIP calculated at block 708. Finally, the RAT 116 dispatches the ALU/JCC micro-op 114 to a reservation station for execution by the execution units 124. Flow proceeds to block 718.

At block 718, the execution unit 124 performs the ALU operation specified by the ALU/JCC micro-op 114 on the operands in the registers specified by the source A 324 and source B 325 fields of the ALU/JCC micro-op 114 to generate a result. The execution unit 124 provides the result to the ROB 128 for storage in the result field 202 (for subsequent storage to the destination register specified by the destination 326 field at block 734, subject to an exception condition). The execution unit 124 also generates an intermediate EFLAGS result based on the value of the result of the ALU operation. The execution unit 124 also executes the conditional jump portion of the ALU/JCC micro-op 114 based on the intermediate EFLAGS result. That is, the execution unit 124 determines whether the intermediate EFLAGS result satisfies the specified condition and resolves the correct target address of the jump. If the condition is satisfied, the execution unit 124 signals the fetch unit 103 to begin fetching at the target address. In one embodiment, the microprocessor 100 includes a branch predictor (not show) that predicts the direction and target address of conditional branch instructions such as the fused JCC macroinstruction 104. In this embodiment, the execution unit 124 compares its direction and target address with the predicted direction and target address and if the prediction was incorrect, the execution unit 124 signals the fetch unit 103 to correct the mistake. Finally, the execution unit 124 sets the completed flag 204. Flow proceeds to block 724.

At block 724, the ROB 128 detects that the ALU/JCC micro-op 114 is the oldest complete micro-op 114 in the ROB 128. That is, the ROB 128 detects that the ALU/JCC micro-op 114 entry 232 is at the head of the ROB 128 and its completed flag 204 is set. Flow proceeds to decision block 728.

At decision block 728, the ROB 128 determines whether the ALU/JCC micro-op 114 has caused an exception condition. That is, the ROB 128 determines whether the exception flag 206 is set in the ROB entry 232 allocated to the ALU/JCC micro-op 114. If so, flow proceeds to block 738; otherwise, flow proceeds to block 734.

At block 734, the ROB 128 retires the register MOV, register ALU, and JCC macroinstructions 104, which includes updating REGX (i.e., the register specified in the destination field 326 of the ALU/JCC micro-op 114) with the value from the result field 202 of the ROB entry 232 of the ALU/JCC micro-op 114. Additionally, retiring the ALU/JCC micro-op 114 includes updating the architectural EFLAGS register with the intermediate value generated at block 718. Finally, retiring the ALU/JCC micro-op 114 includes updating the architectural instruction pointer 107. If the ALU/JCC micro-op 114 was not taken (i.e., the intermediate EFLAGS result calculated at block 718 does not satisfy the condition specified in the ALU/JCC micro-op 114), then the architectural instruction pointer 107 is updated with the value stored in the NSIP field 208 of the ALU/JCC micro-op 114; otherwise, the architectural instruction pointer 107 is updated with the target address calculated at block 718. In one embodiment, the ROB 128 retires the three macroinstructions 104 in the same clock cycle. Flow ends at block 734.

At block 738, because an exception was detected, the ROB 128 does not update the architectural state of the microprocessor 100 with the results of the ALU/JCC micro-op 114. Instead, the ROB 128 invokes an exception handler in the microcode unit 112. The exception handler causes the fetch unit 103 to flush all instructions in the microprocessor 100 pipeline newer than the ALU/JCC micro-op 114. The exception handler also sets the fusing off bit in the control register 105 of FIG. 5 and causes the fetch unit 103 to branch back to the first fused macroinstruction 104, i.e., to the x86 register MOV macroinstruction 104. This will cause the instruction translator 108 to re-translate the register MOV macroinstruction 104 and the register ALU macroinstruction 104 and the JCC macroinstruction 104; however, this time the instruction translator 108 will not fuse the three macroinstructions 104. Rather, the instruction translator 108 will translate them in a conventional manner into three distinct micro-ops 114; namely, the instruction translator 108 will translate the register MOV macroinstruction 104 into a register MOV micro-op 114, will translate the register ALU macroinstruction 104 into a register ALU micro-op 114, and will translate the JCC macroinstruction 104 into a JCC micro-op 114. Consequently, the RAT 116 will not set the fused flag 212 in the ROB entries 232 allocated for the three micro-ops 114, and the RAT 116 will populate the NSIP field 208 of the conventional register MOV micro-op 114 with the memory address of the register ALU macroinstruction 104, will populate the NSIP field 208 of the register ALU micro-op 114 with the memory address of the JCC macroinstruction 104, and will populate the NSIP field 208 of the JCC macroinstruction 104 with the memory address of the next sequential macroinstruction 104 after the JCC macroinstruction 104. Therefore, when the replay of the micro-ops 114 translated from the three macroinstructions 104 occurs, it will be possible for the ROB 128 to determine which of the three macroinstructions 104 caused the exception condition so that the microprocessor 100 can handle the exception appropriately. Flow ends at block 738.

An embodiment is contemplated in which the microprocessor 100 is configured to fuse macroinstructions 104 both in the manner described with respect to FIGS. 1 through 4 and in the manner described with respect to FIGS. 5 through 7.

While various embodiments of the present invention have been described herein, it should be understood that they have been presented by way of example, and not limitation. It will be apparent to persons skilled in the relevant computer arts that various changes in form and detail can be made therein without departing from the scope of the invention. For example, software can enable, for example, the function, fabrication, modeling, simulation, description and/or testing of the apparatus and methods described herein. This can be accomplished through the use of general programming languages (e.g., C, C++), hardware description languages (HDL) including Verilog HDL, VHDL, and so on, or other available programs. Such software can be disposed in any known computer usable medium such as magnetic tape, semiconductor, magnetic disk, or optical disc (e.g., CD-ROM, DVD-ROM, etc.), a network, wire line, wireless or other communications medium. Embodiments of the apparatus and method described herein may be included in a semiconductor intellectual property core, such as a microprocessor core (e.g., embodied in HDL) and transformed to hardware in the production of integrated circuits. Additionally, the apparatus and methods described herein may be embodied as a combination of hardware and software. Thus, the present invention should not be limited by any of the exemplary embodiments described herein, but should be defined only in accordance with the following claims and their equivalents. Specifically, the present invention may be implemented within a microprocessor device which may be used in a general purpose computer. Finally, those skilled in the art should appreciate that they can readily use the disclosed conception and specific embodiments as a basis for designing or modifying other structures for carrying out the same purposes of the present invention without departing from the scope of the invention as defined by the appended claims.

I claim:

1. A microprocessor configured to receive first and second program-adjacent macroinstructions of the instruction set architecture of the microprocessor, wherein the first macroinstruction instructs the microprocessor to move a first operand to a first architectural register of the microprocessor from a second architectural register of the microprocessor, wherein the second macroinstruction instructs the microprocessor to perform an arithmetic/logic operation using the first operand in the second architectural register and a second operand in a third architectural register of the microprocessor to generate a result and to load the result back into the first architectural register, the microprocessor comprising:
 a hardware execution unit;
 an instruction translator, configured to simultaneously translate the first and second program-adjacent macroinstructions into a single micro-operation for execution by the hardware execution unit;
 wherein the single micro-operation instructs the hardware execution unit to perform the arithmetic/logic operation using the first operand in the second architectural register and the second operand in third architectural register to generate the result and to load the result back into the first architectural register; and
 a retire unit, configured to retire both the first and second macroinstructions in the same clock cycle.

2. The microprocessor of claim 1, wherein the instruction set architecture of the microprocessor conforms to the x86 architecture.

3. The microprocessor of claim 1, further comprising:
 a reorder buffer, each entry thereof associated with a distinct micro-operation and having a field configured to hold a next sequential instruction pointer;
 wherein in response to the instruction translator simultaneously translating the first and second program-adjacent macroinstructions into a single micro-operation, the microprocessor populates the field of the entry associated with the single micro-operation with the memory address of a macroinstruction immediately following the second macroinstruction.

4. The microprocessor of claim 3, further comprising:
 an architectural instruction pointer of the microprocessor; and
 a retire unit, configured to update the architectural instruction pointer with the memory address of the macroinstruction immediately following the second macroinstruction from the field in the entry associated with the single micro-operation.

5. The microprocessor of claim 1, wherein if the single micro-operation causes an exception condition, the microprocessor is configured to cause the instruction translator to re-translate the first and second program-adjacent macroinstructions into more than one micro-operations and to cause the hardware execution unit to execute the more than one micro-operations;
   wherein a first of the more than one micro-operations instructs the hardware execution unit to move the first operand to the first architectural register from the second architectural register;
   wherein a second of the more than one micro-operations instructs the hardware execution unit to perform the arithmetic/logic operation using the first operand in the second architectural register and the second operand in the third architectural register to generate the result and to load the result back into the first architectural register.

6. The microprocessor of claim 5, further comprising:
microcode, invoked in response to the exception condition, configured to cause the instruction translator to re-translate the first and second program-adjacent macroinstructions into the more than one micro-operations and to cause the hardware execution unit to execute the more than one micro-operations.

7. The microprocessor of claim 5, further comprising:
a reorder buffer, each entry thereof associated with a distinct micro-operation and having a field configured to hold a next sequential instruction pointer;
   wherein in response to the instruction translator simultaneously translating the first and second program-adjacent macroinstructions into a single micro-operation, the microprocessor populates the field of the entry associated with the single micro-operation with the memory address of a macroinstruction immediately following the second macroinstruction;
   wherein in response to the instruction translator re-translating the first and second program-adjacent macroinstructions into more than one micro-operations, the microprocessor populates the field of the entry associated with the first of the more than one micro-operations with the memory address of the second macroinstruction and populates the field of the entry associated with the second of the more than one micro-operations with the memory address of the macroinstruction immediately following the second macroinstruction.

8. The microprocessor of claim 7, further comprising:
an architectural instruction pointer of the microprocessor;
a retire unit, wherein if the single micro-operation does not cause an exception condition, the retire unit is configured to retire both the first and second macroinstructions in the same clock cycle and to update the architectural instruction pointer with the memory address of the macroinstruction immediately following the second macroinstruction.

9. The microprocessor of claim 8,
   wherein if the first of the more than one micro-operations does not cause an exception condition, the retire unit is configured to retire the first macroinstruction and to update the architectural instruction pointer with the memory address of the second macroinstruction;
   wherein if the second of the more than one micro-operations does not cause an exception condition, the retire unit is configured to retire the second macroinstruction and to update the architectural instruction pointer with the memory address of the macroinstruction immediately following the second macroinstruction.

10. The microprocessor of claim 5, further comprising:
a reorder buffer, each entry thereof associated with a distinct micro-operation and having a flag;
   wherein in response to the instruction translator simultaneously translating the first and second program-adjacent macroinstructions into the single micro-operation, the microprocessor is configured to set the flag of the entry associated with the single micro-operation to a first predetermined value;
   wherein in response to the instruction translator re-translating the first and second program-adjacent macroinstructions, the microprocessor is configured to set the flag of the entries associated with both the first and second of the more than one micro-operation to a second predetermined value distinct from the first predetermined value.

11. A method for a microprocessor to process first and second program-adjacent macroinstructions of the instruction set architecture of the microprocessor, wherein the first macroinstruction instructs the microprocessor to move a first operand to a first architectural register of the microprocessor from a second architectural register of the microprocessor, wherein the second macroinstruction instructs the microprocessor to perform an arithmetic/logic operation using the first operand in the second architectural register and a second operand in a third architectural register of the microprocessor to generate a result and to load the result back into the first architectural register, the method comprising:
   simultaneously translating the first and second program-adjacent macroinstructions into a single micro-operation for execution by an execution unit of the microprocessor;
   wherein the single micro-operation instructs the execution unit to perform the arithmetic/logic operation using the first operand in the second architectural register and the second operand in third architectural register to generate the result and to load the result back into the first architectural register; and
   retiring both the first and second macroinstruction in the same clock cycle.

12. The method of claim 11, wherein the instruction set architecture of the microprocessor conforms to the x86 architecture.

13. The method of claim 11, wherein the microprocessor also includes a reorder buffer, each entry thereof associated with a distinct micro-operation and having a field configured to hold a next sequential instruction pointer, the method further comprising:
   populating the field of the entry associated with the single micro-operation with the memory address of a macroinstruction immediately following the second macroinstruction, in response to said simultaneously translating the first and second program-adjacent macroinstructions into a single micro-operation.

14. The method of claim 13, wherein the microprocessor also includes an architectural instruction pointer of the microprocessor, the method further comprising:
   updating the architectural instruction pointer with the memory address of the macroinstruction immediately following the second macroinstruction from the field in the entry associated with the single micro-operation.

15. The method of claim 11, further comprising:
re-translating the first and second program-adjacent macroinstructions into more than one micro-operations and causing the execution unit to execute the more than one micro-operations, if the single micro-operation causes an exception condition;
   wherein a first of the more than one micro-operations moves the first operand to the first architectural register from the second architectural register;
   wherein a second of the more than one micro-operations performs the arithmetic/logic operation using the first operand in the second architectural register and the second operand in the third architectural register to generate the result and loads the result back into the first architectural register.

16. The method of claim 15, further comprising:
invoking microcode of the microprocessor, in response to the exception condition;
wherein the microcode is configured to cause said re-translating the first and second program-adjacent macroinstructions into more than one micro-operations and to cause the execution unit to execute the more than one micro-operations.

17. The method of claim 15, wherein the microprocessor includes a reorder buffer, each entry thereof associated with a distinct micro-operation and having a field configured to hold a next sequential instruction pointer, the method further comprising:
populating the field of the entry associated with the single micro-operation with the memory address of a macroinstruction immediately following the second macroinstruction, in response to said simultaneously translating the first and second program-adjacent macroinstructions into a single micro-operation; and
populating the field of the entry associated with the first of the more than one micro-operations with the memory address of the second macroinstruction and populating the field of the entry associated with the second of the more than one micro-operations with the memory address of the macroinstruction immediately following the second macroinstruction, in response to said re-translating the first and second program-adjacent macroinstructions into more than one micro-operations.

18. The method of claim 17, further comprising:
retiring both the first and second macroinstructions in the same clock cycle and updating an architectural instruction pointer of the microprocessor with the memory address of the macroinstruction immediately following the second macroinstruction, if the single micro-operation does not cause an exception condition.

19. The method of claim 18, further comprising:
retiring the first macroinstruction and updating the architectural instruction pointer with the memory address of the second macroinstruction, if the first of the more than one micro-operations does not cause an exception condition; and
retiring the second macroinstruction and updating the architectural instruction pointer with the memory address of the macroinstruction immediately following the second macroinstruction, if the second of the more than one micro-operations does not cause an exception condition.

20. The method of claim 15, wherein the microprocessor also includes a reorder buffer, each entry thereof associated with a distinct micro-operation and having a flag, the method further comprising:
setting the flag of the entry associated with the single micro-operation to a first predetermined value, in response to said simultaneously translating the first and second program-adjacent macroinstructions into the single micro-operation; and
setting the flag of the entries associated with both the first and second of the more than one micro-operation to a second predetermined value distinct from the first predetermined value, in response to said re-translating the first and second program-adjacent macroinstructions.

21. A computer program product encoded in at least one non-transitory computer readable medium for use with a computing device, the computer program product comprising:
computer readable program code embodied in said medium, for specifying a microprocessor configured to receive first and second program-adjacent macroinstructions of the instruction set architecture of the microprocessor, wherein the first macroinstruction instructs the microprocessor to move a first operand to a first architectural register of the microprocessor from a second architectural register of the microprocessor, wherein the second macroinstruction instructs the microprocessor to perform an arithmetic/logic operation using the first operand in the second architectural register and a second operand in a third architectural register of the microprocessor to generate a result and to load the result back into the first architectural register, the computer readable program code comprising:
first program code for specifying a hardware execution unit; and
second program code for specifying an instruction translator, configured to simultaneously translate the first and second program-adjacent macroinstructions into a single micro-operation for execution by the hardware execution unit;
wherein the single micro-operation instructs the hardware execution unit to perform the arithmetic/logic operation using the first operand in the second architectural register and the second operand in third architectural register to generate the result and to load the result back into the first architectural register.

22. The computer program product of claim 21, wherein the at least one non-transitory computer readable medium is selected from the set of a disk, tape, or other magnetic, optical, or electronic storage medium and a network or wire line communications medium.

23. A microprocessor configured to receive first and second program-adjacent macroinstructions of the instruction set architecture of the microprocessor, wherein the first macroinstruction instructs the microprocessor to move a first operand to a first architectural register of the microprocessor from a second architectural register of the microprocessor, wherein the second macroinstruction instructs the microprocessor to perform an arithmetic/logic operation using the first operand in the second architectural register and a second operand in a third architectural register of the microprocessor to generate a result and to load the result back into the first architectural register, the microprocessor comprising:
a hardware execution unit; and
an instruction translator, configured to simultaneously translate the first and second program-adjacent macroinstructions into a single micro-operation for execution by the hardware execution unit;
wherein the single micro-operation instructs the hardware execution unit to perform the arithmetic/logic operation using the first operand in the second architectural register and the second operand in third architectural register to generate the result and to load the result back into the first architectural register;
a reorder buffer, each entry thereof associated with a distinct micro-operation and having a field configured to hold a next sequential instruction pointer;
wherein in response to the instruction translator simultaneously translating the first and second program-adjacent macroinstructions into a single micro-operation, the microprocessor populates the field of the entry associated with the single micro-operation with the memory address of a macroinstruction immediately following the second macroinstruction.

24. A microprocessor configured to receive first and second program-adjacent macroinstructions of the instruction set architecture of the microprocessor, wherein the first macroinstruction instructs the microprocessor to move a first operand to a first architectural register of the microprocessor from a second architectural register of the microprocessor, wherein the second macroinstruction instructs the microprocessor to perform an arithmetic/logic operation using the first operand in the second architectural register and a second operand in a third architectural register of the microprocessor to generate a result and to load the result back into the first architectural register, the microprocessor comprising:

a hardware execution unit; and an instruction translator, configured to simultaneously translate the first and second program-adjacent macroinstructions into a single micro-operation for execution by the hardware execution unit;

wherein the single micro-operation instructs the hardware execution unit to perform the arithmetic/logic operation using the first operand in the second architectural register and the second operand in third architectural register to generate the result and to load the result back into the first architectural register;

wherein if the single micro-operation causes an exception condition, the microprocessor is configured to cause the instruction translator to re-translate the first and second program-adjacent macroinstructions into more than one micro-operations and to cause the hardware execution unit to execute the more than one micro-operations;

wherein a first of the more than one micro-operations instructs the hardware execution unit to move the first operand to the first architectural register from the second architectural register; and wherein a second of the more than one micro-operations instructs the hardware execution unit to perform the arithmetic/logic operation using the first operand in the second architectural register and the second operand in the third architectural register to generate the result and to load the result back into the first architectural register.

25. A method for a microprocessor to process first and second program-adjacent macroinstructions of the instruction set architecture of the microprocessor, wherein the first macroinstruction instructs the microprocessor to move a first operand to a first architectural register of the microprocessor from a second architectural register of the microprocessor, wherein the second macroinstruction instructs the microprocessor to perform an arithmetic/logic operation using the first operand in the second architectural register and a second operand in a third architectural register of the microprocessor to generate a result and to load the result back into the first architectural register, the method comprising:

simultaneously translating the first and second program-adjacent macroinstructions into a single micro-operation for execution by an execution unit of the microprocessor;

wherein the single micro-operation instructs the execution unit to perform the arithmetic/logic operation using the first operand in the second architectural register and the second operand in third architectural register to generate the result and to load the result back into the first architectural register;

wherein the microprocessor also includes a reorder buffer, each entry thereof associated with a distinct micro-operation and having a field configured to hold a next sequential instruction pointer; and populating the field of the entry associated with the single micro-operation with the memory address of a macroinstruction immediately following the second macroinstruction, in response to said simultaneously translating the first and second program-adjacent macroinstructions into a single micro-operation.

26. A method for a microprocessor to process first and second program-adjacent macroinstructions of the instruction set architecture of the microprocessor, wherein the first macroinstruction instructs the microprocessor to move a first operand to a first architectural register of the microprocessor from a second architectural register of the microprocessor, wherein the second macroinstruction instructs the microprocessor to perform an arithmetic/logic operation using the first operand in the second architectural register and a second operand in a third architectural register of the microprocessor to generate a result and to load the result back into the first architectural register, the method comprising:

simultaneously translating the first and second program-adjacent macroinstructions into a single micro-operation for execution by an execution unit of the microprocessor;

wherein the single micro-operation instructs the execution unit to perform the arithmetic/logic operation using the first operand in the second architectural register and the second operand in third architectural register to generate the result and to load the result back into the first architectural register;

re-translating the first and second program-adjacent macroinstructions into more than one micro-operations and causing the execution unit to execute the more than one micro-operations, if the single micro-operation causes an exception condition;

wherein a first of the more than one micro-operations moves the first operand to the first architectural register from the second architectural register; and wherein a second of the more than one micro-operations performs the arithmetic/logic operation using the first operand in the second architectural register and the second operand in the third architectural register to generate the result and loads the result back into the first architectural register.

* * * * *